United States Patent
You et al.

(10) Patent No.: US 10,097,741 B2
(45) Date of Patent: *Oct. 9, 2018

(54) CAMERA FOR MEASURING DEPTH IMAGE AND METHOD OF MEASURING DEPTH IMAGE USING THE SAME

(71) Applicant: SAMSUNG ELECTRONICS CO., LTD., Suwon-si (KR)

(72) Inventors: Jang-woo You, Yongin-si (KR); Yong-hwa Park, Yongin-si (KR); Hee-sun Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,874

(22) Filed: Aug. 30, 2017

(65) Prior Publication Data

US 2017/0366713 A1 Dec. 21, 2017

Related U.S. Application Data

(63) Continuation of application No. 14/312,954, filed on Jun. 24, 2014, now Pat. No. 9,781,318.

(30) Foreign Application Priority Data

Dec. 5, 2013 (KR) .................. 10-2013-0150839

(51) Int. Cl.
*H04N 13/02* (2006.01)
*G01C 3/08* (2006.01)
(Continued)

(52) U.S. Cl.
CPC ....... *H04N 5/2254* (2013.01); *G01B 11/2513* (2013.01); *G01S 7/4811* (2013.01);
(Continued)

(58) Field of Classification Search
CPC .... H04N 13/0203; G01S 17/89; G01S 7/4811
See application file for complete search history.

(56) References Cited

U.S. PATENT DOCUMENTS

| | | |
|---|---|---|
| 7,033,736 B2 | 4/2006 | Morris et al. |
| 7,108,402 B2 | 9/2006 | MacKinnon et al. |
| 7,674,019 B2 | 3/2010 | Parkyn et al. |
| | (Continued) | |

FOREIGN PATENT DOCUMENTS

JP 2002-31516 A 1/2002

OTHER PUBLICATIONS

Joenathan, C., "Phase-measuring interferometry: new methods and error analysis," Applied Optics, vol. 33, No. 19, Jul. 1, 1994, pp. 4147-4155.

(Continued)

*Primary Examiner* — Tsion B Owens
(74) *Attorney, Agent, or Firm* — Sughrue Mion, PLLC

(57) ABSTRACT

Provided are a depth camera and methods of measuring a depth image by using the depth camera. The depth camera is a time-of-flight (TOF) depth camera including: an illumination device that illuminates a patterned light to an object; a filter unit that reduces noise light included in light reflected by the object; and an image sensor that provides a depth image of the object by receiving light that enters through the filter unit. The illumination device includes: a light source; and a patterned light generator that changes the light emitted from the light source into the patterned light. The filter unit includes a band pass filter and an optical modulator. The patterned light generator may be a diffractive optical element or a refractive optical element.

9 Claims, 5 Drawing Sheets

(51) Int. Cl.
  *H04N 5/225* (2006.01)
  *G01S 17/89* (2006.01)
  *G01S 17/08* (2006.01)
  *G01S 7/481* (2006.01)
  *G01B 11/25* (2006.01)
  *H04N 13/254* (2018.01)
  *H04N 13/271* (2018.01)

(52) U.S. Cl.
  CPC .............. *G01S 17/08* (2013.01); *G01S 17/89* (2013.01); *H04N 5/2256* (2013.01); *H04N 13/0253* (2013.01); *H04N 13/0271* (2013.01); *H04N 13/254* (2018.05); *H04N 13/271* (2018.05)

(56) References Cited

U.S. PATENT DOCUMENTS

| | | | |
|---|---|---|---|
| 8,320,621 | B2 | 11/2012 | McEldowney |
| 9,418,425 | B2 * | 8/2016 | Park .......................... G01S 17/36 |
| 2008/0240502 | A1 * | 10/2008 | Freedman ........... G01B 11/2513 382/103 |
| 2011/0063437 | A1 * | 3/2011 | Watanabe ............. G01S 7/4802 348/140 |
| 2011/0310220 | A1 * | 12/2011 | McEldowney ...... G02B 5/1895 348/42 |
| 2012/0033045 | A1 * | 2/2012 | Schweizer ............ G01S 7/4912 348/46 |
| 2012/0069176 | A1 * | 3/2012 | Park ......................... G01S 17/89 348/135 |
| 2012/0162370 | A1 * | 6/2012 | Kim ....................... G01B 11/02 348/46 |
| 2012/0229611 | A1 * | 9/2012 | Pellman ................. G03B 15/05 348/49 |
| 2013/0113826 | A1 * | 5/2013 | Miyazaki ............... G06F 3/011 345/632 |
| 2014/0055771 | A1 * | 2/2014 | Oggier .................... G01S 17/89 356/5.01 |

OTHER PUBLICATIONS

Park, Yong-Hwa, et al., "Micro optical system based 3D imaging for full HD depth image capturing," Proc. of SPIE vol. 8252, pp. 1-15.

* cited by examiner

FIG. 4
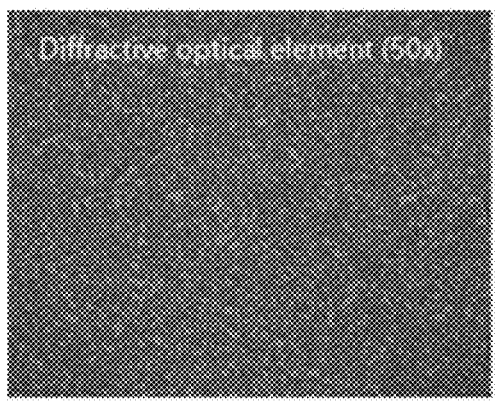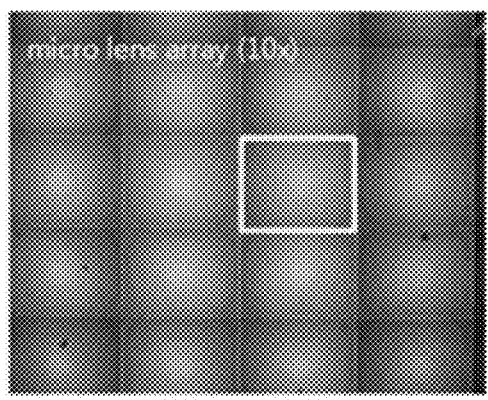

CAMERA FOR MEASURING DEPTH IMAGE AND METHOD OF MEASURING DEPTH IMAGE USING THE SAME

RELATED APPLICATIONS

This is a continuation application of U.S. patent application Ser. No. 14/312,954 filed Jun. 24, 2014, in the U.S. Patent and Trademark Office, which claims priority from Korean Patent Application No. 10-2013-0150839, filed on Dec. 5, 2013 in the Korean Intellectual Property Office, the disclosure of which is incorporated herein by reference in its entirety.

BACKGROUND

1. Field

The present disclosure relates to cameras. In particular, exemplary embodiments relate to cameras for measuring a depth image and methods of measuring a depth image using the same.

2. Description of the Related Art

A depth image of an object may be measured by the following two methods. In a first method, a depth image is obtained by using a pattern light and an optical trigonometry like Kinect. In a second method, after irradiating an infrared IR ray toward an object, a depth image is extracted based on a time-of-flight (TOF), that is, the time required for the IR ray to return to a camera after the IR ray is reflected by the object.

A TOF camera creates a depth image such that, after irradiating a non-visible light, that is, a near IR ray having a wavelength of 850 nm, to an object after modulating the non-visible light to a few tens of MHz, a phase delay of the light that returns to the camera from the object is measured by using an image sensor, and a distance between the object and the camera is obtained from each pixel of the image sensor. Thus, the depth image is created from the distances obtained from the image sensor.

A common feature of depth cameras is that a depth image is taken using a self-illumination. A related art depth camera using TOF has been developed using an LED as a direct illumination without an additional optical system, or has been developed with an illumination which is uniformly irradiated in a field of view.

A depth camera using TOF (hereinafter, a TOF camera) mainly measures a depth image using a homodyne mixing method. In this method, a distance is calculated using an intensity of light that is received in each pixel of an image sensor. Therefore, the illumination should be uniformly irradiated to a space in a field of view of the TOP camera. When the illumination is not uniformly irradiated to space in the field of view, a depth image cannot be obtained for a location where the illumination does not reach. Thus, a resolution of the depth image is reduced.

SUMMARY

Exemplary embodiments may provide time-of-flight (TOF) depth cameras by which a high precision depth image is obtained even in a noise light (e.g., external light) atmosphere.

Exemplary embodiments may provide methods of measuring a depth image using the TOF depth camera.

Additional aspects will be set forth in part in the description which follows and, in part, will be apparent from the description, or may be learned by practice of the exemplary embodiments.

According to an aspect of the exemplary embodiments, the TOF depth camera includes: an illumination device which is configured to illuminate a patterned light to an object; a filter device which is configured to reduce noise light included in light reflected by the object; and an image sensor which is configured to provide a depth image of the object by receiving light that enters through the filter device.

The illumination device may include a light source and a patterned light generator which is configured to change light emitted from the light source into the patterned light.

The filter unit may include a band pass filter and an optical modulator.

The patterned light generator may be a diffractive optical element or a refractive optical element.

According to an aspect of the exemplary embodiments, a method of measuring a depth image includes: irradiating a patterned light on an object; measuring a phase delay of light that is reflected by the object; and measuring a plurality of distances from a depth camera to each of a plurality of regions of the object using the measured phase delay.

The irradiating of the patterned light on the object may include: emitting light from a light source; and changing the light emitted from the light source into the patterned light.

The changing the light emitted from the light source into the patterned light may include diffracting the light using a diffractive optical element.

The changing the light emitted from the light source into the patterned light may include refracting the light using a refractive optical element.

The measuring the phase delay may include: reducing noise light included in the light reflected by the object; and measuring the phase delay of a signal light included in the light that is reflected by the object.

The changing the light emitted from the light source into the patterned light may include changing the light emitted from the light source into the patterned light having a plurality of spots where intensity of light is high relative to a plurality of surrounding regions.

The refractive optical element may be a micro-lens array.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a microscope image of a pattern light generator of the illumination device of FIG. 1;

DETAILED DESCRIPTION OF THE EXEMPLARY EMBODIMENTS

Figure 1:
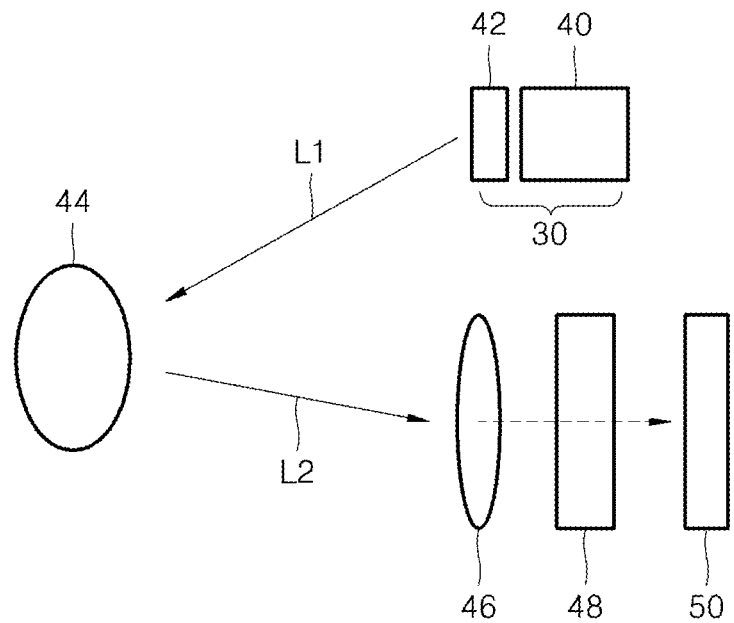
FIG. 1 is a schematic drawing showing a configuration of a time-of-flight (TOF) depth camera according to an embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A depth camera and a method of measuring a depth image according to exemplary embodiments will now be described in detail with reference to the accompanying drawings. In the drawings, the thicknesses of layers and regions may be exaggerated for clarity. The depth camera below may be a TOF 3D camera.

First, a depth camera will be described.

FIG. 1 is a schematic drawing showing a configuration of a time-of-flight (TOF) depth camera (hereinafter, a camera) according to an exemplary embodiment.

Referring to FIG. 1, the camera includes an illumination device 30, a patterned light generator 42, a first lens 46, a filter unit 48, and an image sensor 50. For descriptive convenience, a controller that controls the above elements and a signal processor for processing a depth image signal generated by the image sensor 50 are not depicted.

The illumination device 30 may include a light source 40 and the patterned light generator 42. The light source 40 may be a light source that generates infrared rays. The light source 40 may be a laser diode LD or an LED that emits, for example, infrared rays or near-infrared rays. The patterned light generator 42 may be disposed in front of the light source 40. Light L1 emitted from the light source 40 is incident to an object 44 through the patterned light generator 42. The patterned light generator 42 may modulate light emitted from the light source 40. For example, as depicted in FIG. 2, light that passes through the patterned light generator 42 may have an intensity distribution based on the modulation.

The first lens 46 may be disposed between the object 44 and the filter unit 48. Light L2 that is reflected by the object 44 enters the filter unit 48 through the first lens 46. The first lens 46 focuses the light L2 that enters the first lens 46 on the filter unit 48. Accordingly, the first lens 46 may be a convex lens. The first lens 46 in FIG. 1 may be a biconvex lens. The first lens 46 may be a one-sided convex lens in which one side is convex and the other side is flat. The filter unit 48 may be disposed between the first lens 46 and the image sensor 50. The light that enters the filter unit 48 through the first lens 46 includes depth image information of the object 44 and noise light. The noise light disrupts the measurement of a depth image of the object 44, and all light emitted from the light source 40, except for the light L2 that is reflected by the object 44 and enters the first lens 46, may be noise light. For example, the noise light may be a natural light that directly enters the first lens 46, a natural light that enters the first lens 46 after being reflected by the object 44, or an artificial light that is present around the 3D camera. The natural light includes not only visible light but also invisible light, such as infrared rays present in nature. The filter unit 48 removes most of noise light from the light incident to the filter unit 48 through the first lens 46. The filter unit 48 absorbs or reflects the noise light that enters the filter unit 48. The filter unit 48 may include an optical modulator. The optical modulator transmits only light of a specific wavelength by a voltage driving. The optical modulator may include a Distributed Bragg Reflector (DBR) and a multi-quantum well layer. The filter unit 48 may include a band pass filter. The filter unit 48 may include the optical modulator and/or the band pass filter. When both the optical modulator and the band pass filter are included in the filter unit 48, the band pass filter is configured to reflect or absorb any light that is not blocked by the optical modulator. The image sensor 50 obtains distance information between the camera and the objects 44 by receiving light that includes the distance information through the filter unit 48 and provides a depth image of the object 44 based on the distance information. The image sensor 50 may be a charge coupled device (CCD) or a CMOS image sensor (CIS). When a large amount of noise light is included in light that is incident to the image sensor 50, pixels of the image sensor 50 may be saturated with the noise light or a ratio of the noise light may be greater than that of a signal light transmitted to the image sensor 50. Therefore, a precise depth image may not be obtained. Accordingly, there is a need to develop methods of increasing a ratio of the signal light S to the noise light N in the pixels. One of the methods is performed by the patterned light generator 42.

Figure 2:
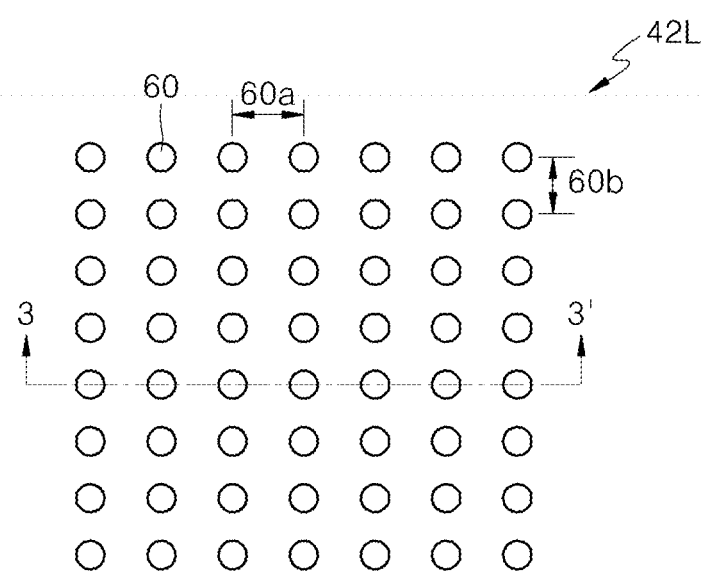
FIG. 2 is a plan view of a patterned light generated by a patterned light generator of an illumination device of the TOF depth camera of FIG. 1.

FIG. 2 is a plan view of a patterned light 42L generated by the patterned light generator 42 of the illumination device 30 of the camera of FIG. 1. The patterned light 42L generated by the patterned light generator 42 is not limited to the patterned light 42L depicted in FIG. 2. The patterned light 42L is an illumination in which an intensity distribution of light forms a specific pattern.

Referring to FIG. 2, a patterned light 42L includes a plurality of spots 60. The spots 60 may be in a lattice arrangement. Each of the spots 60 may be a region having an intensity of light greater than that of a surrounding region. Therefore, each of the spots 60 has a light energy density higher than that of a surrounding region. Horizontal distances 60a and vertical distances 60b between the spots 60 may be different.

Figure 3:
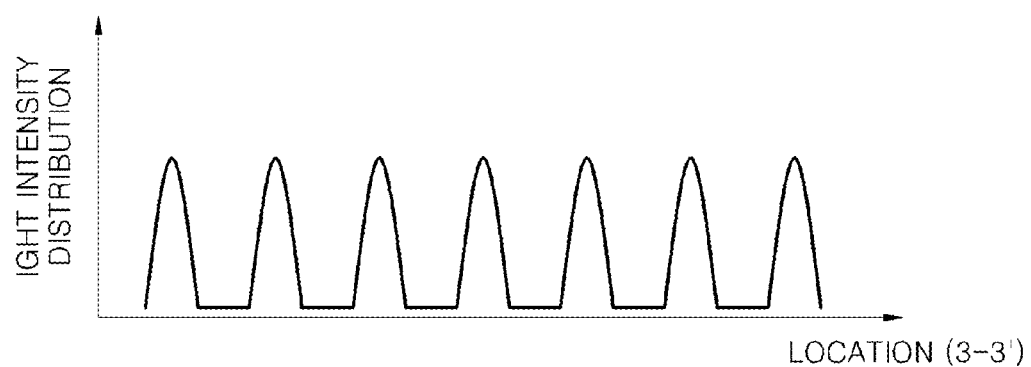
FIG. 3 is a cross-sectional view taken along line 3-3' of the patterned light of FIG. 2 and shows intensity distribution of the patterned light.

FIG. 3 is a cross-sectional view taken along line 3-3' of the patterned light 42L of FIG. 2, that is, the intensity distribution measured along line 3-3' of the patterned light 42L of FIG. 2.

Referring to FIG. 3, the intensity distribution in a direction of line 3-3' may have a periodical pattern. In FIG. 3, locations where the intensity distribution is relatively large correspond to the spots 60 of FIG. 2, and locations where the intensity distribution is relatively small correspond to the spaces between the spots 60 of FIG. 2.

When a depth image is measured by irradiating the patterned light 42L as depicted in FIG. 2 toward the object 44, since the light energy density of the spots 60 is relatively higher than that of regions surrounding the spots 60, the intensity of a signal corresponding to the spots 60 is relatively large in the image sensor 50. For example, the intensity of the signal corresponding to the spots 60 in the image sensor 50 may be four times or more than that of the surrounding region. Accordingly, the signal corresponding to the spots 60 is clearly distinguished even in an atmosphere in which noise light is present. Therefore, a depth image of the object 44 may be clearly measured by measuring a phase delay of light that corresponds to the spots 60 and enters the image sensor 50 using a TOF method. The depth image information of the region of the object 44 corresponding to a region between the spots 60 may be made using an interpolation method. Accordingly, as the density of the spots 60 in the patterned light 42L is increased, the degree of precision of the depth image of the object 44 may be increased.

The patterned light generator 42 that generates the patterned light 42L of FIG. 2 may be, for example, a diffractive optical element or a refractive optical element. The diffractive optical element may be a diffractive plate, and the configuration of the diffractive plate may be designed to generate a desired patterned illumination. Accordingly, various patterned lights having different spot types, spot sizes, spot distances, and degrees of intensity (light energy density) may be generated according to design of the configuration of the diffractive optical element. The refractive optical element may include a plurality of micro-lenses. The refractive optical element may be a micro-lens array. The type, size, gap, and/or energy density of the spots 60 may vary according to the arrangement type of the micro-lenses and the configuration of the micro-lenses.

FIG. 4 is a microscope image of a pattern light generator of the illumination device 30 of FIG. 1. In FIG. 4, a left image is a microscope image of a diffractive optical element and a right image is a microscope image of a refractive optical element (micro-lens array).

Figure 5:
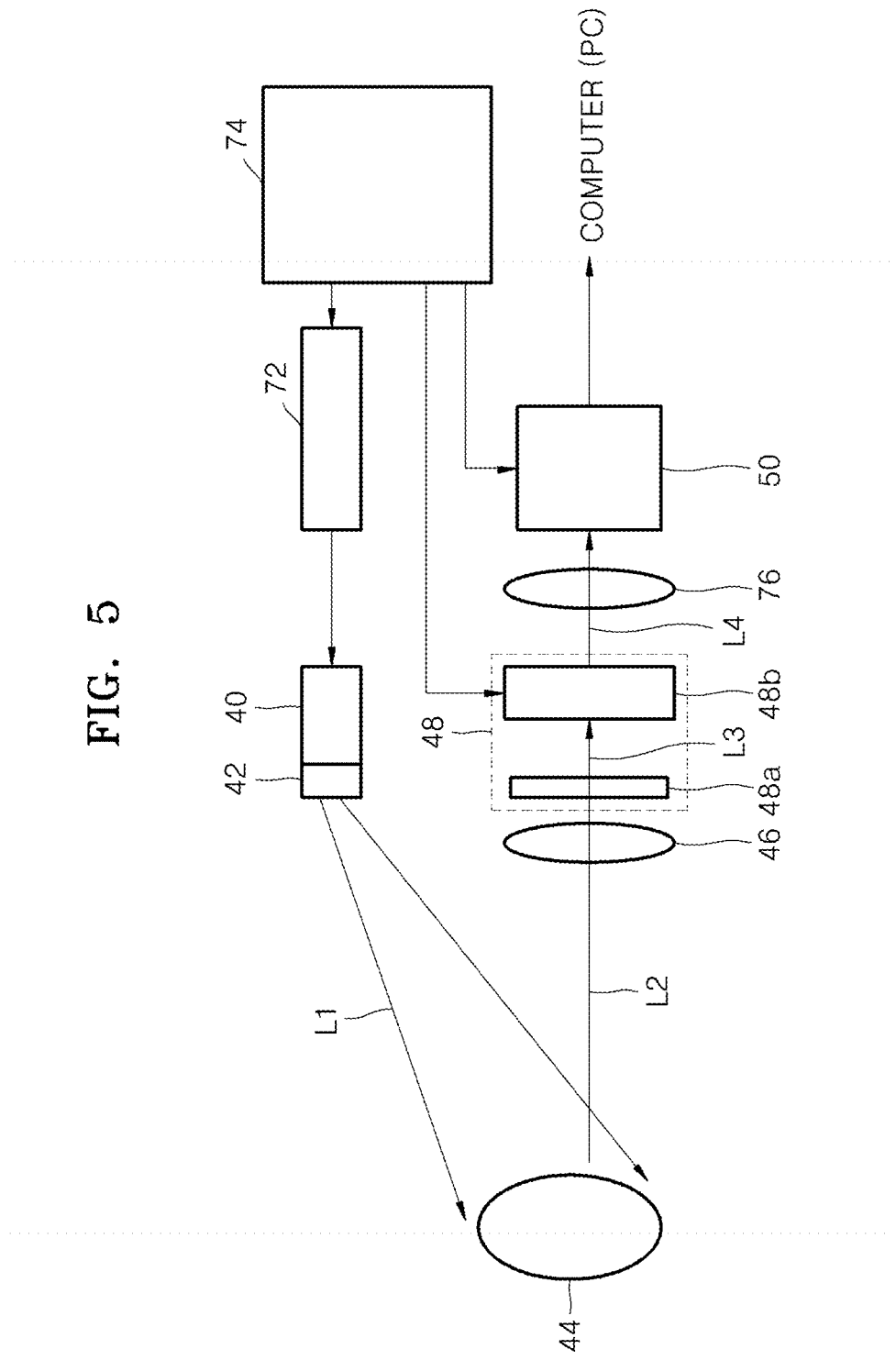
FIG. 5 is a schematic drawing showing a further detailed configuration of the TOF depth camera according to an embodiment.

FIG. 5 shows a further detailed configuration of the TOF camera according to an exemplary embodiment. Like reference numerals are used for elements that are substantially identical to the elements of the camera of FIG. 1.

Referring to FIG. 5, the TOF camera according to an exemplary embodiment may include a light source 40 and a patterned light generator 42 that constitute the illumination device 30, a light source driver 72, a camera controller 74, an image sensor 50, first and second lenses 46 and 76, and a filter unit 48. The filter unit 48 may include a filter 48a and an optical modulator 48b. The first lens 46, the filter 48a, the optical modulator 48b, the second lens 76, and the image sensor 50 may be arranged in a row, and may be on the same optical axis. Light L1 is irradiated onto the object 44 from the light source 40. The light L1 has the patterned light 42L described above and is emitted through the patterned light generator 42. The light L1 may be an infrared ray having a pulse wave or a sign wave. The light source 40 is controlled by the light source driver 72. The operation of the light source driver 72 is controlled by the camera controller 74. The camera controller 74 controls the operations of the optical modulator 48b and the image sensor 50. The first lens 46 focuses light L2 reflected by the object 44 to the filter 48a. The filter 48a may be a band pass filter for removing noise light except the light L1 of the light L2. The band pass filter may be, for example, an IR band filter. The filter 48a may be disposed behind the optical modulator 48b. Light L3 that has passed through the filter 48a enters the optical modulator 48b. Light L4 that has passed through the optical modulator 48b enters the image sensor 50 through the second lens 76. The second lens 76 focuses the light L4 emitted from the optical modulator 48b toward the image sensor 50. When the image sensor 50 is a CCD, the image sensor 50 outputs an accumulated brightness image to a computer by integrating accumulated intensities at a high speed for a predetermined period under the control of the camera controller 74. The method of measuring a depth image using the optical modulator 48b may use a CCD or a CMOS, which is a two dimensional image sensor. Thus, a depth image having a high resolution may be acquired.

A method of measuring a depth image of a camera according to an exemplary embodiment will be described with reference to FIGS. 1 and 6.

Figure 6:
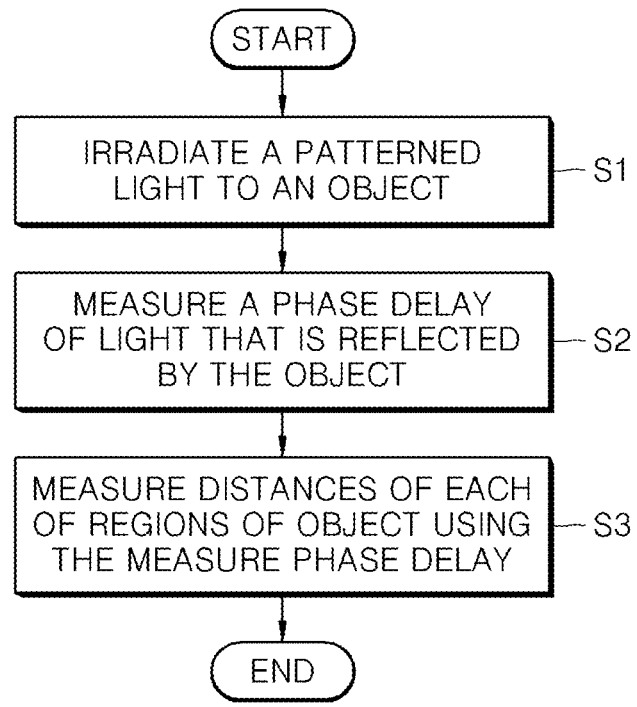
FIG. 6 is a flow chart of a method of measuring a depth image of the TOF depth camera according to an embodiment.

Referring to FIG. 6, a patterned light L1 is irradiated towards the object 44 (S1).

The first operation (S1) includes emitting light from the light source 40, and changing the emitted light into the patterned light L1. The changing the emitted light into the patterned light L1 may include diffracting or refracting the light emitted from the light source 40 using a diffractive optical element or a refractive optical element.

Next, a second operation (S2) includes measuring a phase delay of the light reflected by the object 44.

The phase delay may be measured by comparing the phase of the light emitted from the light source 40 to that of the light reflected by the object 44. The phase delay is a phase delay of light corresponding to the spots 60 of the patterned light L1. The second operation (S2) may include a process of removing or reducing noise light from the light reflected by the object 44 before measuring the phase delay. The removal or reduction of noise light from the light reflected by the object 44 may be performed using the filter unit 48.

Next, a third operation (S3) includes measuring distances from each of the regions of the object 44 to the camera using the measured phase delay.

In the third operation (S3), the distances of the regions of the object 44 corresponding to the spots 60 of the patterned light L1 are measured using the measured phase delay, and distances of the regions of the object 44 corresponding to the gaps between the spots 60 are measured using an interpolation method.

The depth camera according to an exemplary embodiment includes a illumination device having a patterned light generator. The patterned light generator generates a patterned light that includes spots having a relatively large intensity of light (high light energy density) with respect to that of regions surrounding the spots. The patterned light includes a plurality of spots that are in a lattice type arrangement. Regions around the spots have intensities relatively lower than that of the spots. When a depth image of an object is measured by irradiating the patterned light toward the object, a signal of a region of the object corresponding to the spots detected by the image sensor becomes a few times greater than that detected by the image sensor when a uniform illumination is irradiated to the object. The respective signals of regions of the object corresponding to the regions between the spots may be obtained by applying an interpolation method. As a result, a ratio of the signal light to noise light may be increased even in an atmosphere in which noise light is present, thereby allowing for a depth image having a high precision to be obtained.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A time-of-flight (TOF) depth camera comprising:
an illumination device configured to illuminate a patterned light to an object, the patterned light comprising a plurality of spots;
a filter device configured to reduce noise light included in light reflected by the object; and
an image sensor providing a depth image of the object,
wherein the patterned light comprises a plurality of spots, light amount distribution of the patterned light is not uniform on a surface of the object when the patterned light is arrived at the object and a light energy density of each of the plurality of spots is high relative to a light energy density of a surrounding region of the each spot,
wherein the image sensor is configured to:
receive light that enters through the filter device;
measure a phase delay of the received light;
measuring distances from the TOF depth camera respectively to regions of the object corresponding to the plurality of spots, based on the measured phase delay; and
provide the depth image of the object, based on the measured distances, and
wherein the filter device comprises a band pass filter.

2. The TOF depth camera of claim 1, wherein the illumination device comprises:
a light source configured to emit light; and
a patterned light generator configured to change the emitted light into the patterned light.

3. The TOF depth camera of claim 2, wherein the patterned light generator is a diffractive optical element.

4. The TOF depth camera of claim 2, wherein the patterned light generator is a refractive optical element.

5. A method of measuring a depth image, using a time-of-flight (TOF) depth camera, the method comprising:
irradiating a patterned light on an object, the patterned light comprising a plurality of spots;
reducing, by a band pass filter, noise light included in light reflected by the object;
measuring a phase delay of light reflected by the object;
measuring distances from the TOF depth camera respectively to regions of the object corresponding to the plurality of spots, based on the measured phase delay; and
providing the depth image of the object, based on the measured distances,
wherein light amount distribution of the patterned light is not uniform on a surface of the object when the patterned light is arrived at the object and a light energy density of each of the plurality of spots is high relative to a light energy density of a surrounding region of the each spot.

6. The method of claim 5, wherein the irradiating of the patterned light on the object comprises:
emitting light from a light source; and
changing the emitted light into the patterned light.

7. The method of claim 6, wherein the changing of the emitted light into the patterned light comprises diffracting the emitted light, using a diffractive optical element.

8. The method of claim 6, wherein the changing of the emitted light into the patterned light comprises refracting the emitted light, using a refractive optical element.

9. The method of claim 8, wherein the refractive optical element is a micro-lens array.

* * * * *